United States Patent
Zand et al.

(10) Patent No.: US 12,302,279 B1
(45) Date of Patent: May 13, 2025

(54) DETERMINING DISTANCES BETWEEN BROADCASTING DEVICES AND RECEIVING DEVICES

(71) Applicant: Cypress Semiconductor Corporation, San Jose, CA (US)

(72) Inventors: Pouria Zand, Irvine, CA (US); James Wihardja, Tustin, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 523 days.

(21) Appl. No.: 17/342,371

(22) Filed: Jun. 8, 2021

Related U.S. Application Data

(60) Provisional application No. 63/127,922, filed on Dec. 18, 2020.

(51) Int. Cl.
*H04W 64/00* (2009.01)
*G01S 5/02* (2010.01)
*H04W 72/0446* (2023.01)
*H04W 72/30* (2023.01)

(52) U.S. Cl.
CPC ......... *H04W 64/003* (2013.01); *G01S 5/0284* (2013.01); *H04W 72/0446* (2013.01); *H04W 72/30* (2023.01)

(58) Field of Classification Search
None
See application file for complete search history.

(56) References Cited

U.S. PATENT DOCUMENTS

| | | | |
|---|---|---|---|
| 2020/0100283 A1* | 3/2020 | Naguib | B60R 25/24 |
| 2022/0022132 A1* | 1/2022 | Knaappila | H04W 52/0216 |
| 2022/0141893 A1* | 5/2022 | Choi | H04W 4/80 |
| | | | 370/329 |
| 2023/0164622 A1* | 5/2023 | Kim | H04W 28/0289 |
| | | | 370/235 |
| 2024/0022887 A1* | 1/2024 | Wulff | H04W 8/005 |
| 2024/0134948 A1* | 4/2024 | Smith | G06Q 20/40145 |

OTHER PUBLICATIONS

Bluetooth SIG Proprietary, "Periodic Advertising with Multiple Responses, Bluetooth® Draft Improvement Proposal Document (DIPD), 6.3 Periodic Advertising with Multiple Responses", vr02, 4pgs. (Nov. 9, 2020).

* cited by examiner

*Primary Examiner* — Willie J Daniel, Jr.

(57) ABSTRACT

A system includes a broadcasting device and one or more receiving devices. The broadcast device is to broadcast an broadcast message to a set of receiving devices, wherein the broadcast message indicates that a broadcasting device is available for connection. The broadcasting device is also to receive, from a receiving device a response messages based on the broadcast message. The broadcasting device is further to determine a distance between the broadcasting device and the receiving device.

15 Claims, 12 Drawing Sheets

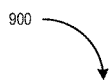

| RTT type | Estimated Number of required packets (p) | Update rate per second One group (g==1) | Maximum number of network size per AP (N) | Update rate per second two groups (g==2) | Maximum number of network size per AP (N) | Update rate per second 10 group (g==10) | Maximum number of network size per AP (N) |
|---|---|---|---|---|---|---|---|
| Coarse | 50 | 1000/(p*((N+g)*0.625))=~1 | 31 | 1000/(p*((N+g)*0.625))=~1 | 30 | 1000/(p*((N+g)*0.625))=~1 | 22 |
| Fractional | 16 | ~1 | 100 | ~1 | 98 | ~1 | 90 |
| Fractional with sounding sequence | 1 | ~1 | 1600 | ~1 | 1598 | ~1 | 1590 |
| Fractional with random bit | 1 | ~1 | 1600 | ~1 | 1598 | ~1 | 1590 |

DETERMINING DISTANCES BETWEEN BROADCASTING DEVICES AND RECEIVING DEVICES

CROSS-REFERENCE TO RELATED APPLICATIONS

This application claims the benefit of U.S. Provisional Patent Application No. 63/127,922, filed on Dec. 18, 2020. The disclosure of the above-referenced application is hereby incorporated by reference in its entirety.

BACKGROUND

Computing devices and/or electronic devices often communicate with each other using communication networks. These communication networks may use different network or communication protocols. One such network or communication protocol may be Bluetooth. Various devices may establish connections with each other and communicate data (e.g., transmit and/or receive data) with each other using the Bluetooth protocol.

BRIEF DESCRIPTION OF THE DRAWINGS

The disclosure is illustrated by way of example, and not of limitation, in the figures of the accompanying drawings.

FIG. 9 is an example table that illustrates example parameters of a network that may use advertising and response messages to determine round trip times according to one or more embodiments.

DETAILED DESCRIPTION

As discussed above, various devices (e.g., computing devices) may establish connections with each other and communicate data (e.g., transmit and/or receive data) using the Bluetooth protocol. One version or type of the Bluetooth protocol may be the Bluetooth Low Energy (LE) protocol. As more and more devices are included in or join a communication network, it may be useful to determine the distance and/or position of these various devices. There are many applications and/or uses for determining the distance/position of these various devices. For example, it may be useful to track the positions/locations of robots in warehouse, of fans in a concert, of customers' cart in the shopping centers, of drones, of passengers at an entrance gate, of passengers in or around a bus/train.

A round trip time (RTT) of messages may be used to track the position and/or locations of devices. Often, a direct or dedicated connection may be established between two devices, to determine the distance between the two devices based on the RTT. This may use more network resources of a communication network (e.g., timeslots, frequencies, etc.). In addition, the messages used to determine the RTT are often not secure. This may allow malicious users or devices to intercept these messages and masquerade as devices on the network, or to use the RTT for their own purposes. Thus, it may be useful to allow a device to determine the distance to another device without using a direct/dedicated connection. It may also be useful to determine the distance to the other device in a more safe and/or secure manner.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the disclosure. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Figure 1A:
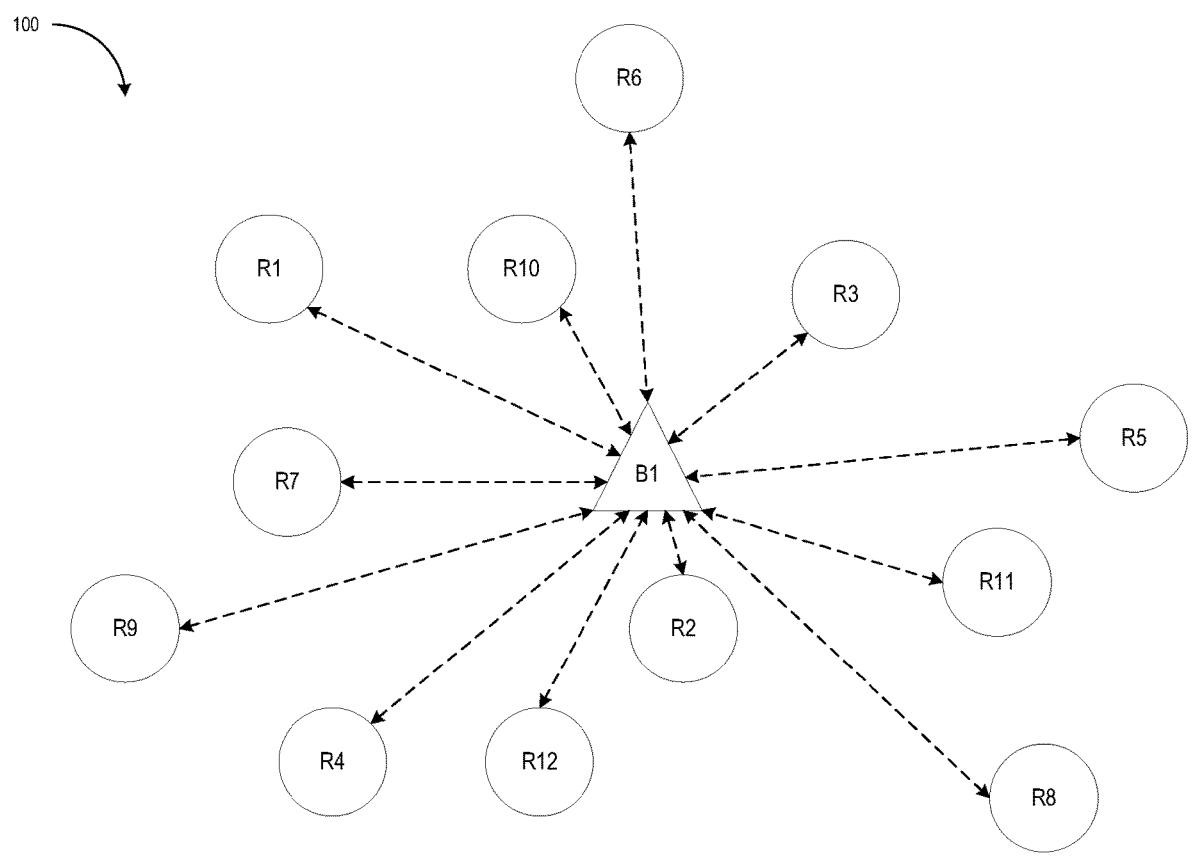
FIG. 1A is a block diagram illustrating an example communication network according to one or more embodiments.

FIG. 1A is a block diagram illustrating an example communication network 100 according to one or more embodiments. The communication network 100 includes a broadcasting device B1, receiving device R1, receiving device R2, receiving device R3, receiving device R4, receiving device R5, receiving device R6, receiving device R7, receiving device R8, receiving device R9, receiving device R10, receiving device R11, and receiving device R12. A broadcasting device may be any device that is capable of wireless communications (e.g., capable of transmitting and/or receiving data via a wireless transmission medium, such as radio-frequency signals). A receiving device may also be any device that is capable of wireless communications. The communication network 100 may allow the receiving devices R1 through R12 to communicate data (e.g., transmit and/or receive data) with the broadcasting device B1. The communication network 100 may also allow the receiving devices R1 through R12 to communicate data between each other (e.g., R1 may communicate data with R8, R3 may communicate data with R4, etc.).

In one embodiment the communication network 100 may be a Bluetooth network. A Bluetooth network may be a network where the devices (e.g., broadcasting device B1 and receiving devices R1 through R12) communicate data using the Bluetooth protocol. In some embodiments, the Bluetooth network may be a Bluetooth Low Energy (LE) network (e.g., a network that uses the Bluetooth LE protocol). The broadcasting devices B1 and the receiving devices R1 through R12 may be computing devices. A computing devices may be may be any device, machine, or apparatus that is capable of executing a set of instructions (sequential or otherwise) that specify actions to be taken by that device. A computing device may include a processing device (e.g., one or more of a processor, a central processing unit (CPU), a processing core, etc.), a memory (e.g., flash memory, a hard disk, random access memory, etc.) and/or other components/devices. Examples of a computing device may include, but are not limited to Internet-of-Things (IoT) devices, computers (e.g., laptop computers, desktop computers, server computers table computers), cellular devices (e.g., smartphones, a cell phone, etc.), smart home devices, wearable devices (e.g., smartwatches), a tracking device, tracking tags, a Bluetooth tag, etc.

In one embodiment, the broadcasting device B1 may broadcast (e.g., transmit) an advertising message to the receiving devices R1 through R12 and/or to other devices that are part of the communication network 100. An advertising message may be any message, packet, frame, etc., that is transmitted on a network and that is received by one or more other devices on the network. The advertising messages and/or response messages may be used by the broadcasting devices and/or receiving devices R1 through R12 to communicate data via a common communication channel (e.g., a shared communication channel, an advertising channel, etc.).

As discussed above, the communication network 100 may be a Bluetooth network (e.g., a Bluetooth LE network). In one embodiment, the advertising message may be a AUX_SYNC_IND message/packet. In another embodiment, the advertising message may be a NEW_ADVERTISEMENT message/packet or any other message (e.g., a broadcasted message) that indicates an advertisement.

In one embodiment, the broadcasting device B1 may receive a set of response messages (e.g., a plurality of response messages) from one or more of the receiving devices R1 through R12, based on the advertising message (e.g., the broadcast message). For example, after receiving the advertising message (broadcasted/transmitted by the broadcasting device B1), each of the receiving devices R1 through R12 may responsively transmit a response message to the broadcasting device B1.

In one embodiment, the response message (transmitted by any one of receiving devices R1 through R12) may be a Bluetooth RSP_PACKET message/packet.

In one embodiment, the advertising messages (e.g., broadcast messages) and/or the response messages may be connectionless communications. For example, the broadcasting device B1 and the receiving devices R1 through R12 may communicate advertising messages and/or the response messages without establishing direct connections and/or communication channels with each other. Thus, the exchange of advertising messages and/or response messages may be a connectionless exchange (e.g. Bluetooth LE connectionless mode).

In another embodiment, the advertising messages and/or the response messages communicated may be communicated (e.g., transmitted and/or received) via an advertising communication channel. The advertising communication channel may be a shared or common communication channel that is used by multiple devices, such as the broadcasting device B1 and the receiving devices R1 through R12. The use of a shared or common channel may allow the broadcasting device B1 and the receiving devices R1 through R12 to communicate the advertising/response messages without establishing direct/dedicated connections (e.g., may allow for connectionless communications).

In one embodiment, the response messages transmitted by the receiving devices R1 through R12 may include data (e.g., first data) that allows the broadcasting device to determine, estimate, approximate, etc., a distance between the receiving devices R1 through R12. For example, the response message received from receiving device R4 may include a time of arrival, a time of departure, and/or a difference between the time or arrival and time of departure that is used by the broadcasting device B1 to determine or estimate the distance between the broadcasting device B1 and receiving device R4. For example, a response message transmitted by receiving device R8 may include data (e.g., first data) that may indicate one or more of when the receiving device R8 received the advertising message from the broadcasting device B1, when the receiving device R8 transmitted the response message.

In one embodiment, the data that allows or is used by the broadcasting device B1 to determine/estimate the distance (between the broadcasting device B1 and a receiving device) may be included in a payload portion (e.g., a protocol data unit) of a response message, as discussed in more detail below.

In one embodiment, the response message may also include data that is used by the broadcasting device B1 to determine the angle of arrival (AoA) and/or the angle of departure (AoD) of various messages/packets, such as the response messages and the advertising messages. For example, the response message may include additional data that indicates the AoA of an advertising message received from the broadcasting device B1. This may allow the broadcasting device to determine both a relative elevation and/or position of a receiving device. For example, the additional data may allow the broadcasting device B1 to determine whether receiving device R11 is above, below, to the left, or to the right of the broadcasting device B1.

In one embodiment, the broadcasting device B1 may determine a set of distances between the broadcasting device B1 and the receiving devices R1 through R12 based on the response messages. For example, based on a time when the advertising message was received by each receiving device, a time when each receiving device transmitted the response message, and/or a difference between the two times, the broadcasting device B1 may determine/estimate a distance between the broadcasting device B1 and each receiving device (e.g., by determining an RTT for broadcast/response messages).

In one embodiment, the advertising messages and the receiving messages may be communicated between the broadcasting device B1 and the receiving devise R1 through R12 based on an advertisement interval. The advertisement interval may also be referred to as a broadcast interval. The advertisement interval may be divided into sub-intervals (e.g., advertisement sub-intervals). The sub-intervals may be divided into timeslots. At the first timeslot of each sub-interval, the broadcasting device may broadcast/transmit the advertising message. Each subsequent timeslot in the sub-interval may be associated with one of the receiving devices R1 through R12, as discussed in more detail below. The assignment and/or association of different receiving devices to different timeslots may be performed during an initial process (e.g., a registration process, an initiation process, a provisioning process, a setup process, etc.).

In one embodiment, a receiving device (e.g., one or more receiving devices R1 through R12) may receive an advertising message transmitted by the broadcasting device B1. The receiving device may transmit a response message based on or in response to the advertising message. The receiving device may transmit the response message during an assigned timeslot of a sub-interval of an advertisement period, as discussed in more detail below.

As discussed above, the advertising messages and the response messages are used by the communication network for various purposes. By piggybacking the data/information that is used to determine the distance (e.g., the first data, a difference between a time or departure and a time of arrival, etc.) in other types of messages, the resources and/or bandwidth used by the communication network 100 may be reduced. This may help reduce the amount of network resources used by the communication network 100. In addition, the data that is used to determine the distances (e.g., the first data) may be encrypted to prevent malicious users from masquerading as devices in the communication network. This may improve the security of the communication network 100.

Figure 1B:
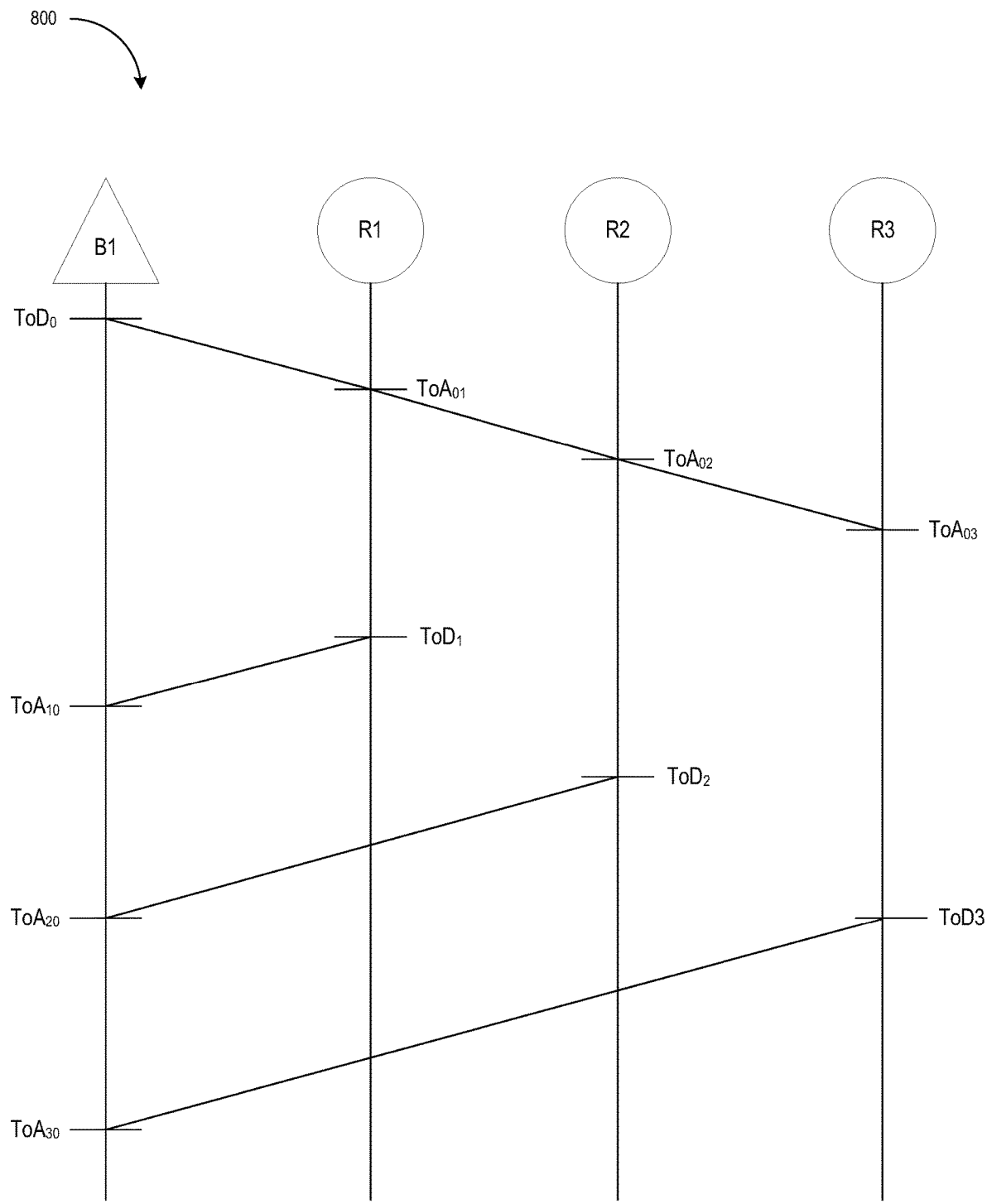
FIG. 1B shows an example timing diagram illustrating transmission and reception of messages by different devices according to one or more embodiments.

FIG. 1B shows an example timing diagram 150 illustrating transmission and reception of messages by different devices according to one or more embodiments. The timing diagram 150 includes broadcasting device B1 and receiving devices R1 through R3 (illustrated FIG. 1A). As discussed above, the broadcasting device B1 may transmit (e.g., broadcast) an advertising message to the receiving devices R1 though R3. Each of the receiving devices R1 though R3 may transmit a response message to the broadcasting device B1.

The broadcasting device B1 may determine a round trip time (RTT) for each receiving device R1 through R3, as discussed in more detail below. The RTT for a receiving device may be the sum of the time of flight (ToF) for the advertising message to reach a receiving device (e.g., the amount of time over the air it takes for the broadcasting device's radio-frequency signal to reach the receiving device) and the ToF for the response message to reach the broadcasting device (e.g., the amount of time over the air it takes for the receiving device's radio-frequency signal to reach the broadcasting device). For example, the RTT may be 2*ToF. The RTT may be used to determine or estimate the distance between the broadcasting device and the receiving device. For example, the distance between the broadcasting device and the receiving device may be determined based on the RTT and the speed that the associated radio-frequency signals (e.g., messages, packets, frames, etc.) travel through a wireless transmission medium (e.g., the speed of light).

Timing diagram 150 illustrates the times when the broadcasting device B1 transmits an advertising message and receives response messages from the receiving devices R1 through R3. The broadcasting device transmits the advertising message at time $ToD_0$ (e.g., a time of departure). Receiving device R1 receives the advertising message time $ToA_{01}$, receiving device R2 receives the advertising message time $ToA_{02}$, and receiving device R3 receives the advertising message time $ToA_{03}$. Receiving device R1 transmits a response message at time $ToD_1$, receiving device R2 transmits a response message at time $ToD_2$, and receiving device R3 transmits a response message at time $ToD_3$. Broadcasting device B1 receives the response from receiving device R1 at time $ToA_{10}$, receives the response from receiving device R2 at time $ToA_{20}$, and receives the response from receiving device R3 at time $ToA_{30}$.

In one embodiment, the round trip time (RTT) to transmit a broadcast message and receive the response message from any receiving device X may be determined based on equation (1) below.

$$RTT_{0X}=2ToF_{0X}=(ToA_{X0}-ToD_0)-(ToD_X-ToA_{0X}) \quad (1)$$

Thus (based on equation (1)), the round trip times $RTT_{01}$, $RTT_{02}$, and $RTT_{03}$, may be determined using equations (2) through (4) below.

$$RTT_{01}=2ToF_{01}=(ToA_{10}-ToD_0)-(ToD_1-ToA_{01}) \quad (2)$$

$$RTT_{02}=2ToF_{02}=(ToA_{20}-ToD_0)-(ToD_1-ToA_{02}) \quad (3)$$

$$RTT_{03}=2ToF_{03}=(ToA_{30}-ToD_0)-(ToD_1-ToA_{03}) \quad (4)$$

Figure 2:
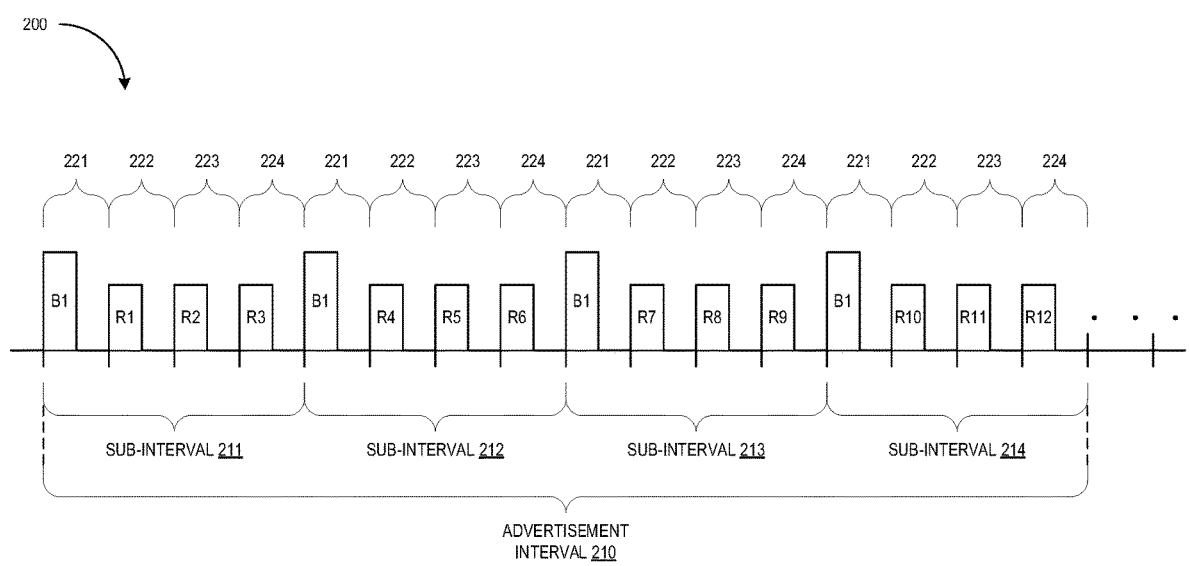
FIG. 2 is an example timing diagram illustrating transmission of messages by different devices according to one or more embodiments.

FIG. 2 is an example timing diagram 200 illustrating transmission of messages by different devices according to one or more embodiments. As discussed above (in conjunction with FIG. 1A), a communication network (e.g., communication network 100) may include a broadcasting device B1 and receiving devices R1 through R12. The broadcasting devices may broadcast advertising messages (e.g., broadcast messages) to the receiving devices R1 through R12 and the receiving devices may transmit response messages to the broadcasting devices (in response to the advertising messages).

As illustrated in FIG. 2, the timing diagram 200 illustrates an advertisement interval (e.g., a Bluetooth advertisement interval) during which the broadcasting device B1 may transmit one or more advertising messages and during which the receiving devices R1 through R12 may transmit one or more response messages.

The advertisement interval 210 is divided into four sub-intervals, sub-intervals 211 through 214. Each sub-interval includes timeslots 221 through 224. The broadcasting device B1 may transmit an advertising message (e.g., an AUX_SYNC_IND packet, a NEW_ADVERTISEMENT packet, etc.) during the timeslot 221 of each sub-interval. For example, the AUX_SYNC_IND packet may be transmitted at the beginning of the first sub-interval 211 in the advertisement interval 210. The NEW_ADVERTISEMENT packet (rather than the AUX_SYNC_IND packet) may be transmitted at the beginning of each of the remaining sub-intervals 212 through 214 in the advertisement interval 210. Each of the receiving devices is assigned or associated with one of the timeslots 222 through 224. For example, receiving device R1 is associated with or assigned timeslot 222 in sub-interval 211. In another example, receiving device R8 is associated with or assigned timeslot 223 in sub-interval 213. Different groups or subsets of receiving devices may be associated with timeslots for different sub-intervals. For example, receiving devices R1 through R3 are associated with or assigned timeslots in sub-interval 211. As illustrated in FIG. 2, each of the receiving devices R1 through R12 may transmit a response message at the associated timeslot. For example, R1 transmits a response message at time slot 222 in sub-interval 211, R5 transmits a response message at timeslot 223 in sub-interval 212, etc.

In one embodiment, the broadcasting device B1 may assign or associate each receiving device with a timeslot in a sub-interval during an initial process (e.g., a registration process, an initiation process, a provisioning process, a setup process, etc.). For example, each receiving device may initially communicate with the broadcasting device B1 via a dedicated communication channel. The broadcasting device B1 may transmit a message to the receiving device indicating which timeslot and which sub-interval has been assigned to the receiving device.

In one embodiment, each response message is transmitted (by a respective receiving device) and/or received by the broadcasting device B1 within a predetermined period of time (e.g., before a predetermined period of time has expired). For example, the response messages from the receiving devices R1 through R3 may be received before sub-interval 212 starts (e.g., received within the period of time for the sub-interval 211). In another example, the response messages from the receiving devices R4 through R6 may be received before sub-interval 213 starts (e.g., received within the period of time for the sub-interval 212). In further example, the response messages for the receiving devices R1 through R12 may be received by the end of the timeslot when the respective receiving device transmitted the response message (e.g., the response message transmitted by receiving device R1 is received by the broadcasting device B1 before the end of timeslot 222).

Figure 3:
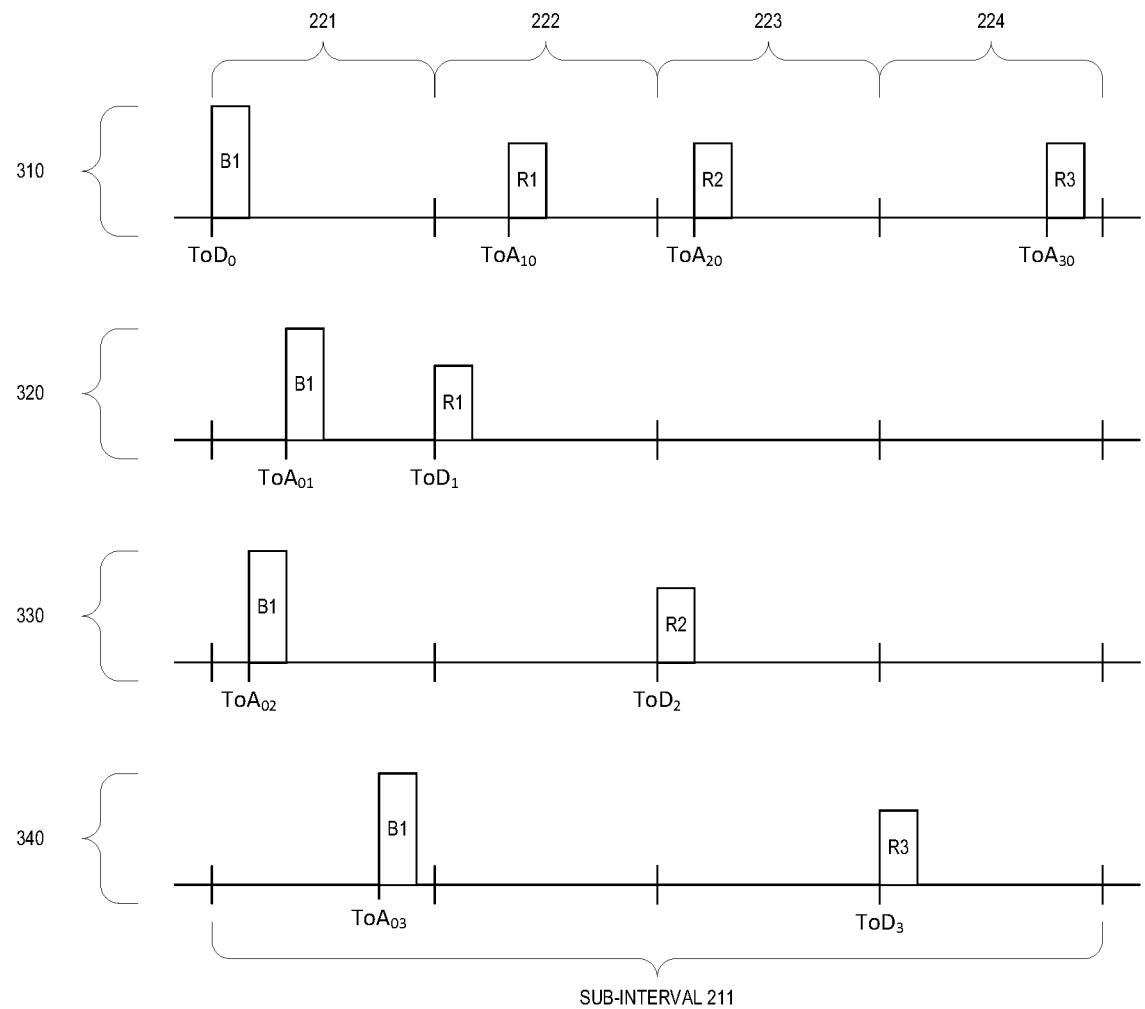
FIG. 3 shows example timing diagrams illustrating transmission and reception of messages by different devices according to one or more embodiments.

FIG. 3 shows example timing diagrams 310, 320, 330, and 330 illustrating transmission and reception of messages by different devices according to one or more embodiments. As discussed above (in conjunction with FIG. 1A), a communication network (e.g., communication network 100) may include a broadcasting device B1 and receiving devices R1 through R12. The broadcasting devices may broadcast advertising messages (e.g., broadcast messages) to the receiving devices R1 through R12 and the receiving devices may transmit response messages to the broadcasting devices (in response to the advertising messages). Although there are a total of thirteen devices illustrated in FIG. 1A, the timing diagrams 310 through 330 illustrated in FIG. 3 correspond to broadcasting device B1, receiving device R1, receiving device R2, and receiving device R3. For example, the timing diagrams 310 through 330 illustrated in FIG. 3 correspond to sub-interval 211.

Timing diagram 310 illustrates the times when the broadcasting device B1 transmit an advertising message and receives response messages. The broadcasting device transmits the advertising message at time $ToD_0$ (e.g., a time of departure) in time slot 221. The first response message from receiving device R1 is received at time $ToA_{10}$ (e.g., a time of arrival). The second response message from receiving device R2 is received at time $ToA_{20}$. The third response message from receiving device R3 is received at time $ToA_{30}$.

Timing diagram 320 illustrates the times when the receiving device R1 receives the advertising message and transmits a response message. The receiving device R1 receives the advertising message at block $ToA_{01}$ and transmits the response message at time $ToD_1$. As discussed above, the response message may include data that indicates one or more of the time $ToD_1$, time $ToA_{01}$, and a difference between time $ToD_1$ and time $ToA_{01}$.

Timing diagram 330 illustrates the times when the receiving device R2 receives the advertising message and transmits a response message. The receiving device R1 receives the advertising message at block $ToA_{02}$ and transmits the response message at time $ToD_2$. As discussed above, the response message may include data that indicates one or more of the time $ToD_2$ and time $ToA_{02}$, and a difference between time $ToD_2$ and time $ToA_{02}$.

Timing diagram 340 illustrates the times when the receiving device 3 receives the advertising message and transmits a response message. The receiving device R1 receives the advertising message at block $ToA_{03}$ and transmits the response message at time $ToD_3$. As discussed above, the response message may include data that indicates one or more of the time $ToD_3$ and time $ToA_{03}$, and a difference between time $ToD_3$ and time $ToA_{03}$.

As discussed above, the RTT (e.g., the ToF for the advertising message and the ToF for the response message) may be determined based on equation (1) described herein.

The RTT for a receiving device may be used to determine or estimate the distance between the broadcasting device and the receiving device (e.g., based on RTT and the speed of light).

Figure 4A:
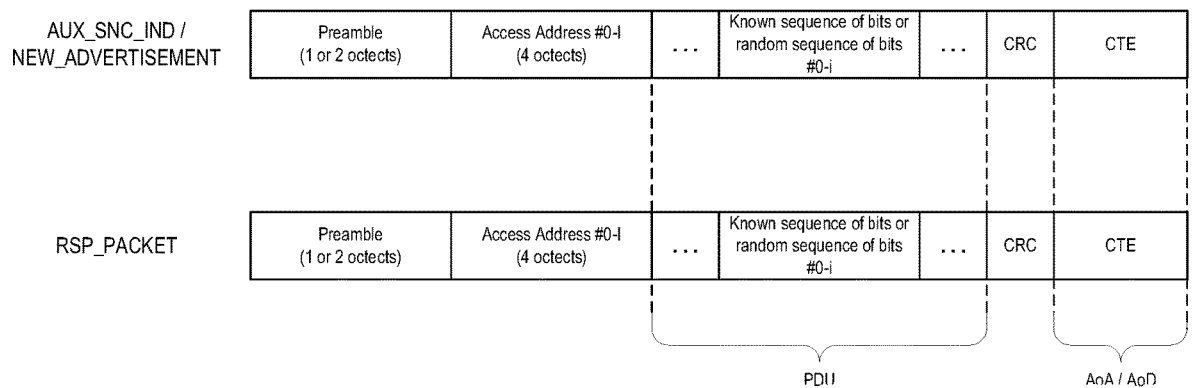
FIG. 4A is a block diagram illustrating example messages that may be transmitted and received in a communication network.

FIG. 4A is a block diagram illustrating example messages that may be transmitted and received in a communication network. As discussed above, the communication network may be a Bluetooth network, such as a Bluetooth LE network. The communication network may include one or more broadcasting devices (e.g., broadcasters, beacons, etc.) and may include one or more receiving devices (e.g., Bluetooth devices, Bluetooth tags, etc.). The broadcasting device may broadcast (e.g., transmit) advertising messages (e.g., broadcast messages) and the receiving devices may transmit responses messages, as discussed above.

As discussed above, one type of advertising message may be an AUX_SYNC_IND packet/message. Another type of advertising message may be a NEW_ADVERTISEMENT packet/message. As illustrated in FIG. 4A, advertising messages such as the AUX_SYNC_IND packet and the NEW_ADVERTISEMENT packet may have the same format. The advertising message includes a preamble (which may be 1-2 octets), an access address (which may be four octets), and a protocol data unit (PDU). The access address may allow a receiving device to determine a more precise time when an advertising message was received by the receiving device. The size/length of the PDU may vary in different types of advertisements (e.g., different types of advertising messages). The advertising message may also include cyclic redundancy check bits (CRC). In one embodiment, the advertising message may optionally include a constant tone extension (CTE). The CTE may include optional data which may be used to determine the AOA and/or AOD of a message. For example, the CTE may include angular data/information as specified in the Bluetooth Core Specification.

Also as discussed above, one type of response message may be a Bluetooth RSP_PACKET packet/message. As illustrated in FIG. 4A, a response message such the RSP_PACKET packet includes a preamble (which may be 1-2 octets), an access address (which may be four octets), and a protocol data unit (PDU). The size/length of the PDU may vary in different embodiments. The response message may also include a cyclic redundancy check bits (CRC). In one embodiment, the response message may optionally include a constant tone extension (CTE). The CTE may include optional and/or additional data which may be used to determine the AoA and/or AoD of a message.

As discussed above, the RSP_PACKET may include the data used by the broadcasting device to determine the distance between the broadcasting device and a receiving device. For example, the RSP_PACKET may include an access address that may be used by a broadcasting device to determine a time when a response message was received by the broadcasting device. The access address may be generated in a secure manner. For example, the access address may be generated using a block cipher, an encryption algorithm, a hashing algorithm, etc.

In one embodiment, the access address may be generated or determined (by a broadcasting device or a receiving device) using a deterministic random bit generator (DRBG), which in turn uses a block cipher, such as an Advanced Encryption Standard (AES) 128-bit block cipher. The block cipher may use a security function that accepts a key and a nonce vector. The key and the nonce vector may be provisioned, instantiated, etc., prior to communicating the advertising messages and the response messages. For example, the key and the nonce vector may be shared between the broadcasting device and the receiving device. The nonce vector may be incremented each time a message is transmitted. For example, each time a broadcasting device transmits an advertising message or a receiving device transmits a response message, it may increment its respective nonce vector.

In one embodiment, each time a broadcasting device transmits an advertising message, it may generate a new and/or different access address. This may make it more difficult for malicious devices or uses to pretend that they are also a broadcasting device and may prevent a man in the middle (MITM) attack. The receiving devices that receive the broadcasting device may be able to verify the access address using the key and the nonce vector that were provisioned or exchanged between the broadcasting device and the receiving devices.

In one embodiment, each time a receiving device transmits a response message, it may generate a new and/or different access address. For example, when a receiving device includes the data (e.g., one or more of a first time when an advertising message was received by a receiving device, a second time when a response message was transmitted by the receiving device, and a difference between the first time and the second time), the receiving device may encrypt, encipher, etc., the data using the block cipher to generate the access address. This may make it more difficult for malicious devices or users to pretend that they are also a receiving devices and may prevent a man in the middle (MITM) attack.

In one embodiment, the access address allows the RTT and/or the distance between the broadcasting devices to be determined more precisely and/or accurately. For example, the access address may allow the broadcasting device to determine a more precise time (e.g., a time with a higher resolution) when the response message was received by the broadcasting device, as discussed in more detail below.

Figure 4B:
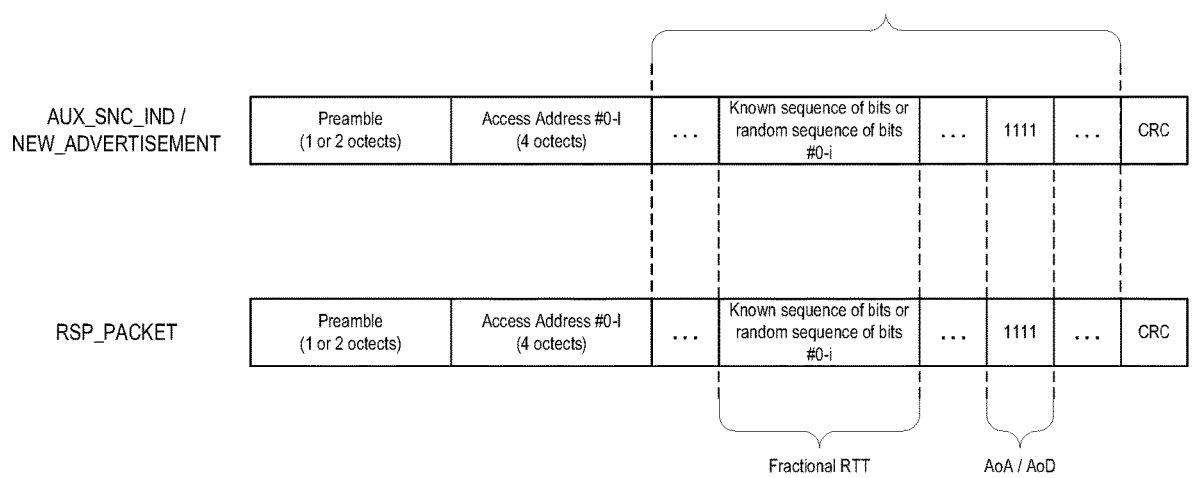
FIG. 4B is a block diagram illustrating example messages that may be transmitted and received in a communication network.

FIG. 4B is a block diagram illustrating example messages that may be transmitted and received in a communication network. The messages may be examples of advertising/broadcast messages and response messages. The portions/fields of the messages may be similar to the portions/fields described above in FIG. 4A. The advertising message (e.g., AUX_SYNC_IND/NEW ADVERTISEMENT) includes a preamble (which may be 1-2 octets), an access address (which may be four octets and is known by both the transmitting device and the receiving device), and a protocol data unit (PDU). The advertising message may also include a cyclic redundancy check bits (CRC). In one embodiment, optional and/or additional data (which may be used to determine the AoA and/or AoD of a message) may be included as part of the PDU.

The response message (e.g., RSP_PACKET packet) includes a preamble (which may be 1-2 octets), an access address (which may be four octets), and a protocol data unit (PDU). The size/length of the PDU may vary in different embodiments. The response message may also include a cyclic redundancy check bits (CRC). In one embodiment, the additional data (which may be used to determine the AoA and/or AoD of a message) may be included in the PDU.

Figure 5:
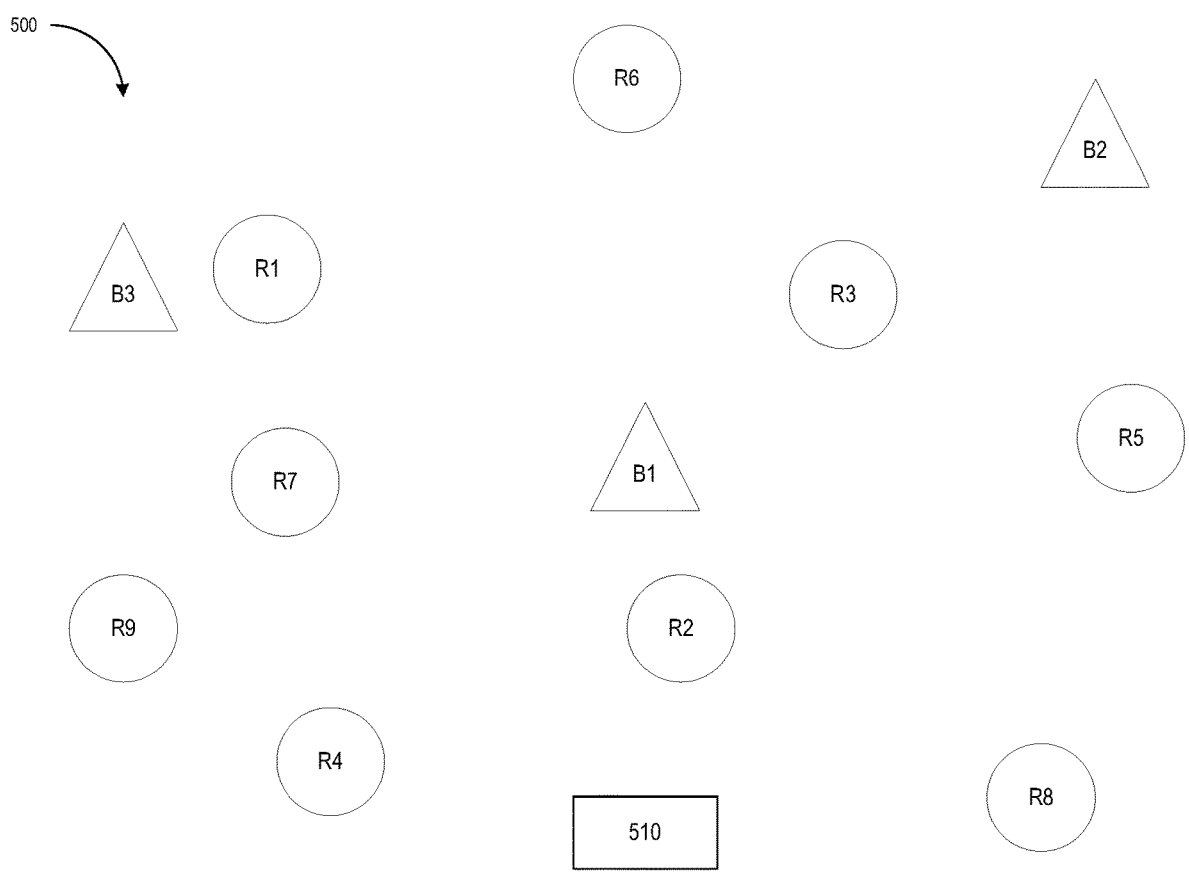
FIG. 5 is a block diagram illustrating an example communication network according to one or more embodiments.

In one embodiment, the PDU may also include additional timing data which may be used to determine the RTT with greater precision or resolution. For example, the additional timing data may allow the broadcasting device to determine a more precise time when a receiving device received the advertising message. The additional timing data may include a series of random bits (e.g., a random bit sequent), a sounding sequence, etc. For example, a sounding sequence (e.g., a repletion of the bit pattern "01" may allow a device (e.g., either a broadcasting device that receives a response message or a receiving device that receives a broadcast message) to determine a fractional time component based on the phase relationship of the resulting spectrum components FIG. 5 is a block diagram illustrating an example communication network 500 according to one or more embodiments. The communication network 500 includes a broadcasting device B1, broadcasting device B2, broadcasting device B3, receiving device R1, receiving device R2, receiving device R3, receiving device R4, receiving device R5, receiving device R6, receiving device R7, receiving device R8, and receiving device R9. The communication network 500 may allow the receiving devices R1 through R9 to communicate data (e.g., transmit and/or receive data) with the broadcasting device B1. The communication network 100 may also allow the receiving devices R1 through R9 to communicate data between each other.

In one embodiment the communication network 500 may be a Bluetooth network. For example, the communication network 500 may be a Bluetooth Low Energy (LE) network (e.g., a network that uses the Bluetooth LE protocol). The broadcasting devices B1 and the receiving devices R1 through R9 may be computing devices.

In one embodiment, the broadcasting devices B1 through B3 may each broadcast (e.g., transmit) an advertising message (e.g., a broadcast message) to the receiving devices R1 through R9 and/or to other devices that are part of the communication network 100. The advertising message may be a AUX_SYNC_IND message/packet or a NEW_ADVERTISEMENT message/packet.

In one embodiment, each of the broadcasting devices B1 through B3 may receive a set of response messages (e.g., one or more response messages) from one or more of the receiving devices R1 through R9, based on the advertising message. The response message (transmitted by any one of receiving devices R1 through R9) may be a Bluetooth RSP_PACKET message/packet.

The advertising messages and/or the response messages may be connectionless communications. The advertising messages and/or the response messages communicated may be communicated (e.g., transmitted and/or received) via an advertising communication channel (e.g., a shared or common channel).

The response messages transmitted by the receiving devices R1 through R9 may include data (e.g., first data) allows the broadcasting device to determine, estimate, approximate, etc., a distance between the receiving devices R1 through R9. The response messages may also include additional and/or optional data that is used by the broadcasting device B1 to determine the angle of arrival (AoA) and/or the angle of departure (AoD) of various messages/packets, such as the response messages and the advertising messages.

In one embodiment, using three or more broadcasting devices (e.g., broadcasting devices B1 through B3) may allow the position of a receiving devices (e.g., a position in Cartesian space, in 3-dimensional space, etc.) to be determined. For example, the broadcasting devices B1 through B3 may each determine a respective distance to a receiving device. Based on the three distances, the position of the receiving device may be triangulated, determined, calculated, etc.

Figure 6:
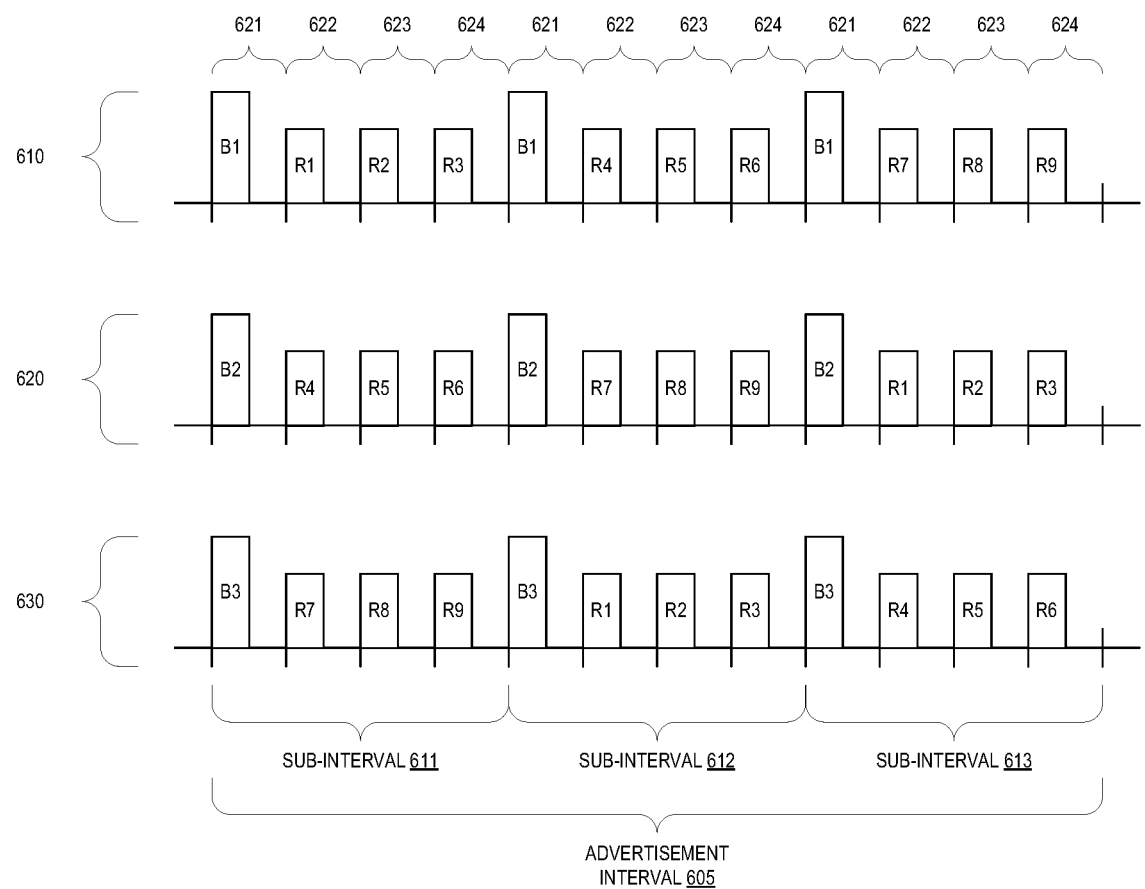
FIG. 6 shows example timing diagrams illustrating when messages are transmitted by different devices according to one or more embodiments.

In one embodiment, each broadcasting device B1 through B3 may transmit the advertising message to the receiving devices R1 through R9 using different frequencies (e.g., different radio frequencies), as illustrated in FIG. 6. In addition, each broadcasting device B1 through B3 may transmit the advertising messages to and receive responses messages from a different subset of the receiving devices R1 through R9 during a sub-interval. The timing of the sub-intervals for the broadcasting devices B1 through B3 and the receiving devices R1 through R9 may be synchronized. For example, the beginning time and the ending time for each sub-interval may be the same (or within a threshold time of each other) for the broadcasting devices B1 through B3 and the receiving devices R1 through R9.

By communicating with different subsets of the receiving devices R1 through R9 and using different frequencies, the broadcasting devices B1 through B3 may be able to transmit advertising messages and receive response messages in a short period of time. For example, if each of the broadcasting devices B1 through B3 used the same frequency, the broadcasting devices B1 through B3 would communicate with the receiving devices sequentially (e.g., B1 would communicate first, B2 would communicate second, and B3 would communicated third). It may take nine subintervals for the broadcasting devices B1 through B3 to communicate with the receiving devices sequentially. However, by using different frequencies, the broadcasting devices B1 through B3 are able to communicate with a different subset or group of the receiving devices R1 through R9 simultaneously or concurrently. This may reduce the number of sub-intervals for the broadcasting devices B1 through B3 to communicate with the receiving devices.

In one embodiment, the broadcasting devices B1 through B3 may each transmit a set of distances to a computing device 510 (e.g., a server computer or some other computing device). The computing device 510 may use the sets of distances received from broadcasting devices B1 through B3 to determine the positions of the receiving devices R1 through R9. For example, for each receiving device R1 through R9, the computing device may receive three distances, one from broadcasting device B1, one from broadcasting device B2, and one from broadcasting device B3. The computing device 510 may use triangulation to determine the position of each of the receiving devices R1 through R9. In other embodiments, any one of the broadcasting devices B1 through B3 and/or the receiving devices R1 through R9 may use triangulation to determine the position of each of the receiving devices R1 through R9.

FIG. 6 is an example timing diagrams 610, 620, and 630 illustrating when messages are transmitted by different devices according to one or more embodiments. As discussed above (in conjunction with FIG. 5), a communication network (e.g., communication network 500) may include broadcasting devices B1 through B3 and receiving devices R1 through R9. The broadcasting devices B1 through B3 may broadcast advertising messages (e.g., broadcast messages) to the receiving devices R1 through R9 and the receiving devices may transmit response messages to the broadcasting devices (in response to the advertising messages). As discussed above, the broadcasting devices B1 through B3 may each use different frequencies to communicate with the receiving devices R1 through R9. The receiving devices R1 through R9 may switch between the different frequencies based on the sub-interval.

In one embodiment, the usage of different frequencies and the schedule of when different receiving devices R1 through R9 will transmit response messages may be coordinated, managed, etc., by one or more of the broadcasting devices B1 through B3. For example, broadcasting device B1 may determine a schedule that indicates when different receiving devices should transmit responses messages to different broadcasting devices and what frequency should be used for the advertising/response messages. The broadcasting device B1 may provide the schedule and/or instructions to the broadcasting devices B2 through B3, and receiving devices R1 through R9. In another embodiment, a separate device (e.g., computing device 510 illustrated in FIG. 5) may determine the schedule and transmit the schedule and/or instructions to the broadcasting devices B1 through B3 and the receiving devices R1 through R9.

As illustrated in FIG. 6, the timing diagrams 610, 620 and 630 illustrate an advertisement interval (e.g., an advertisement interval, a Bluetooth advertisement interval) during which the broadcasting device B1 may transmit one or more advertising messages and may during which the receiving devices R1 through R9 may transmit one or more response messages.

The advertisement interval 605 is divided into three sub-intervals, sub-intervals 611 through 613. Each sub-interval includes timeslots 621 through 624. The broadcasting devices B1 through B3 may transmit an advertising message (e.g., an AUX_SYNC_IND packet, a NEW_ADVERTISEMENT packet, etc.) during the timeslot 621 of each sub-interval. Different groups/subsets of the receiving devices R1 through R9 are associated with the timeslots for a sub-interval. For example, during sub-interval 611, receiving devices R1 through R3 are assigned to timeslots 622 through 624 for broadcasting device B1, receiving devices R4 through R6 are assigned to timeslots 622 through 624 for broadcasting device B2, and receiving devices R7 through R9 are assigned to timeslots 622 through 624 for broadcasting device B3. During sub-interval 611, receiving devices R1 through R3 may use the same frequency as the broadcasting device B1, receiving devices R4 through R6 may use the same frequency as the broadcasting device B2, and receiving devices R7 through R9 may use the same frequency as the broadcasting device B3. During sub-interval 612, receiving devices R4 through R6 may use the same frequency as the broadcasting device B1 (e.g., may switch frequencies), receiving devices R7 through R9 may use the same frequency as the broadcasting device B2, and receiving devices R1 through R3 may use the same frequency as the broadcasting device B3. During sub-interval 613, receiving devices R7 through R9 may use the same frequency as the broadcasting device B1, receiving devices R1 through R3 may use the same frequency as the broadcasting device B2, and receiving devices R4 through R6 may use the same frequency as the broadcasting device B3.

In one embodiment, each response message is transmitted (by a respective receiving device) and/or received by a respective broadcasting device within a predetermined period of time. For example, the response messages from the receiving devices R1 through R3 may be received by broadcasting device B1 before sub-interval 612 starts (e.g., are received within the period of time for the sub-interval 611). In another example, the response messages from the receiving devices R4 through R6 may be received by broadcasting device B2 before sub-interval 612 starts (e.g., are received within the period of time for the sub-interval 611).

Figure 7:
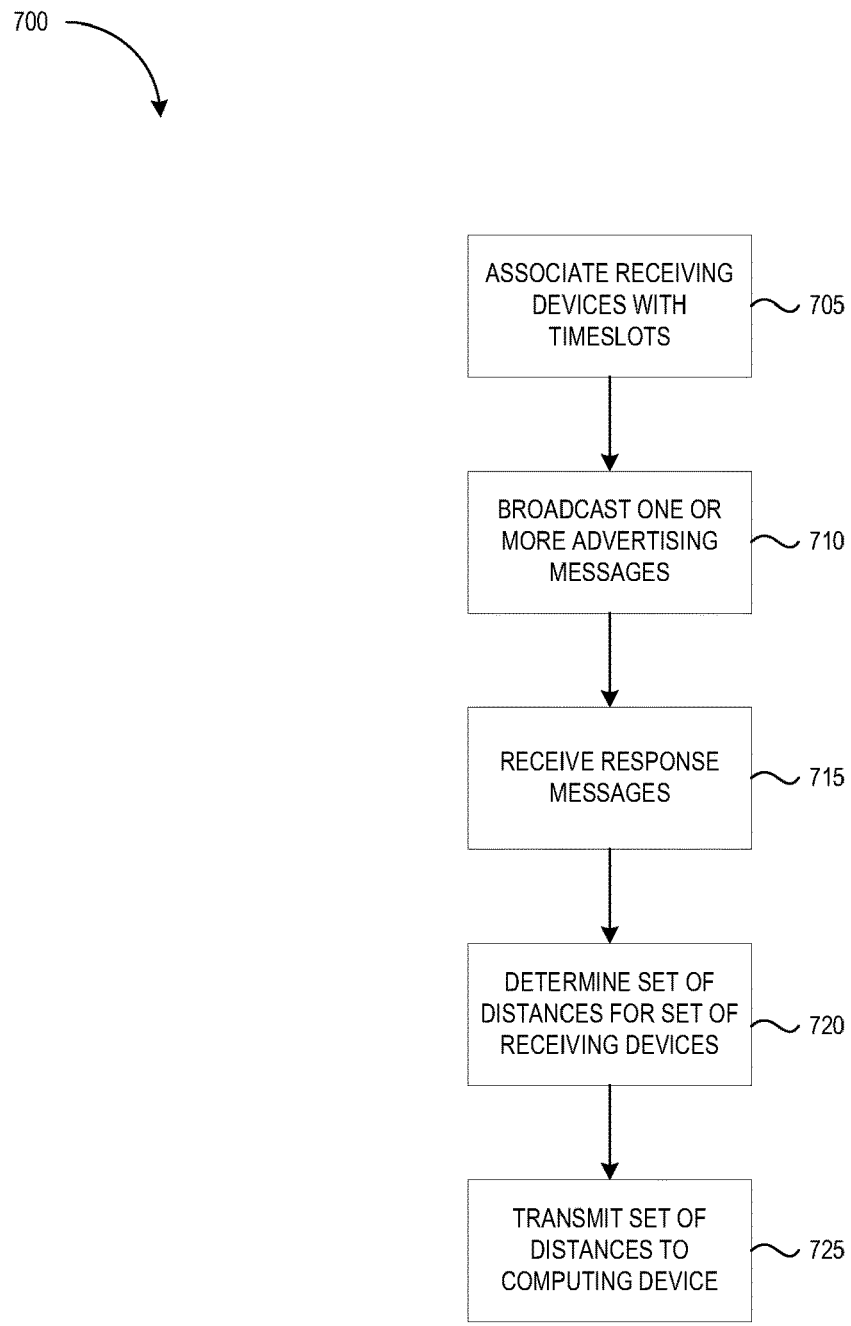
FIG. 7 is a flow diagram of a method of determining a set of distances according to one or more embodiments.

FIG. 7 is a flow diagram of a method 700 of determining a set of distances according to one or more embodiments. The method 700 can be performed by processing logic that comprises hardware (e.g., circuitry, dedicated logic, programmable logic, microcode, etc.), firmware, or a combination thereof. In one example embodiment, the method 700 is performed by processing logic included in a broadcasting device.

At block 705, the method 700 may optionally associate different receiving devices with different timeslots of different sub-intervals, as discussed above. For example, the method 700 may communicate with each receiving device and may assign each receiving device a timeslot in one of a plurality of sub-intervals. At block 710, the method 700 may broadcast one or more advertising messages (e.g., broadcast messages). For example, the method 700 may transmit a AUX_SYNC_IND packet or a NEW_ADVERTISEMENT packet.

At block 715, the method 700 may receive response messages from the receiving devices. For example, the method 700 may receive RSP_PACKET messages/packets. Each of the response messages may include data that may be used to determine the distance between the broadcasting device and the respective receiving device that transmitted the response message. At block 720, the method 700 may determine a set of distances between the receiving devices and the broadcasting devices. For example, the method 700 may determine the RTT for each receiving device and determine the distance to each receiving device based on the RTT. At block 725, the method 700 may optionally transmit the set of distances to a computing device. For example, in a communication network where multiple broadcasting devices are used to determine the positions (e.g., Cartesian position/coordinates) of the receiving devices, the method 700 may transmit the set of distances to the computing device.

Figure 8:
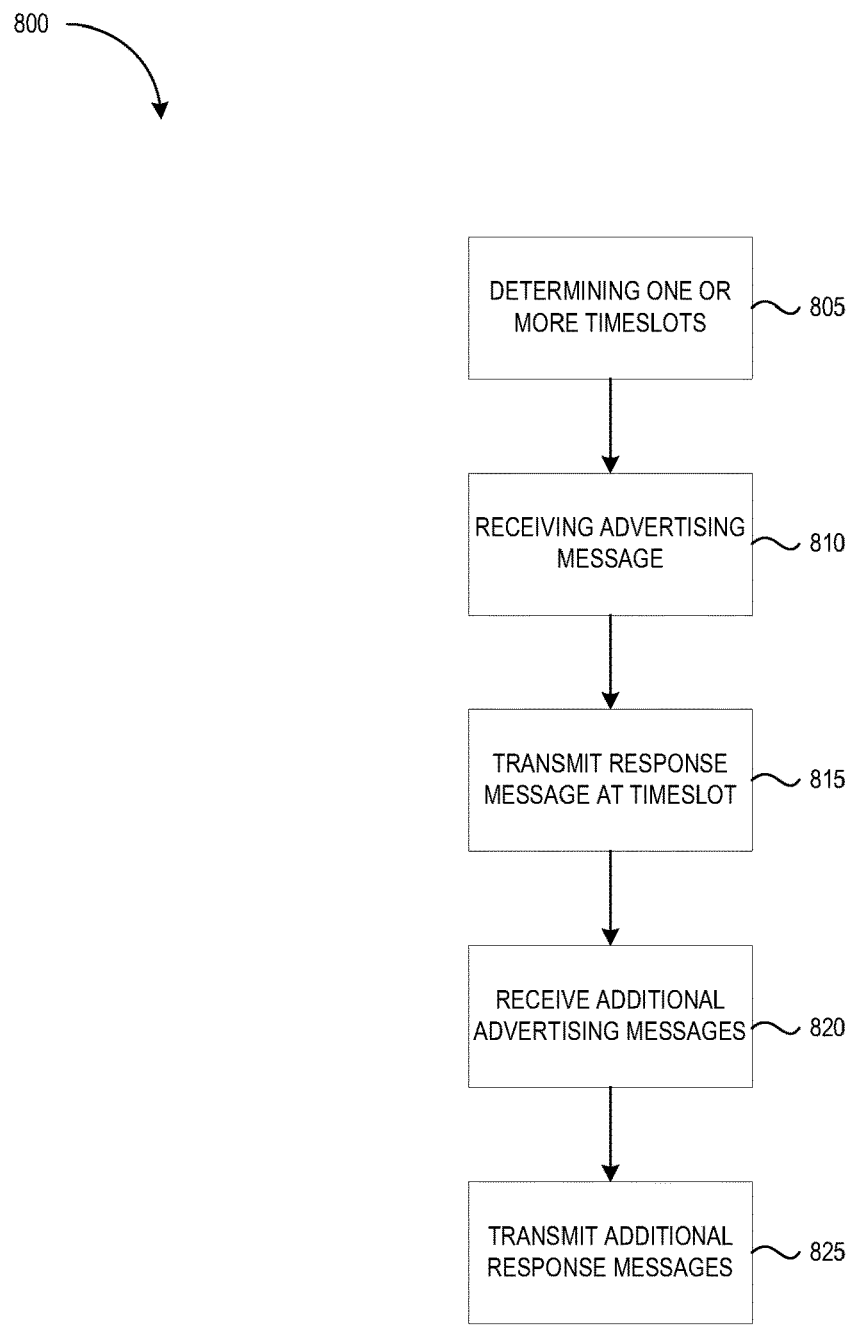
FIG. 8 is a flow diagram of a method of transmitting response messages according to one or more embodiments.

FIG. 8 is a flow diagram of a method 800 of transmitting response messages according to one or more embodiments. The method 800 can be performed by processing logic that comprises hardware (e.g., circuitry, dedicated logic, programmable logic, microcode, etc.), firmware, or a combination thereof. In one example embodiment, the method 800 is performed by processing logic included a receiving device.

At block 805, the method 800 may determine one or more timeslots. For example, the method 800 may communicate with one or more broadcasting devices to determine which timeslots have been assigned to the receiving device by the one or more broadcasting devices. At block 810, the method 800 may receive an advertising message (e.g., a broadcast message) from a broadcasting device. For example, the method 800 may receive a AUX_SYNC_IND packet or a NEW_ADVERTISEMENT packet.

At block 815, the method 800 may transmit a response message to the broadcasting device. For example, the method 800 may transmit a RSP_PACKET messages/packet. The response message may include data that may be used to determine the distance between the broadcasting device and the receiving device that transmitted the response message.

At block 820, the method 800 includes receiving one or more additional advertising messages from one or more additional broadcasting devices. For example, in a communication network where multiple broadcasting devices are used to determine the positions (e.g., Cartesian position/coordinates) of receiving device, the method 800 may receive multiple advertising messages. At block 825, the method 800 may transmit one or more additional responses messages to the one or more additional broadcasting devices. For example, the method 800 may transmit an additional response message to each additional broadcasting device, at an assigned timeslot for each additional broadcasting device.

FIG. 9 is an example table 900 that illustrates example parameters of a network that may use advertising and response messages to determine round trip times according to one or more embodiments. In one embodiment table 900 may indicate how many devices may be supported by a network that uses advertising messages and response messages to determine RTT and/or distances between broadcasting devices and receiving devices when different methods are used to determine the RTT.

Each row of the table 900 indicates a method that is used to determine the RTT. The first row is for a coarse (e.g., "Coarse") calculation of RTT that uses an access address to determine when a message was received. For example, a device may match the access address in a message (e.g., an advertising message, a response message, etc.) with a known access address to determine a coarse time of arrival. The coarse time of arrival may be the clock instant when the access address is detected. The time resolution is limited by the sampling period, which may be proportional to the symbol period. To overcome this limitation, multiple packet exchanges may be used required and averaged over multiple measurements. The time resolution of the measurements may increase because the relative sampling instants for two devices change for every packet exchange.

The second row is for a fractional method of determining the RTT that uses an access address. For example, additional data may be embedded in the message, along with the access address. The additional data may result in additional in-phase and quadrature (IQ) samples that allow a device to more precisely determine the correlation peak of the response message (e.g., to determine a fractional component of time that may more precisely indicate when a message was received).

The third for is for a fractional method that uses a sounding sequence to determine RTT. For example, a sounding sequence (e.g., a specific sequence of repetitions of "01") may be included in the message, along with the access address. The periodicity of the sounding sequence allows an algorithm, that is based on the phase relationship of the resulting spectrum components, to approximate a fractional time component.

The fourth row is for a fractional method that uses random bits to determine the RTT. For example, a random bit sequence may be included in the message, along with the access address. The random bit sequence allows an algorithm, that is based on the phase relationship of the resulting spectrum components, to approximate the fractional time component.

The first column of table 900 indicates the method for determining the RTT. The second column indicates the number of packets (e.g., the number of RTT packets) to achieve a threshold accuracy. For example, using a coarse method, 50 packets may be used to determine the RTT. The third column indicates the rate at which the distance between broadcasting/receiving devices will be updated or calculated for one group of receiving devices. The fourth column indicates how may receiving devices may be located/positioned. For example, for fractional RTT, 100 receiving devices can be located/positioned.

The fifth column indicates the rate at which the distance between broadcasting/receiving devices will be updated or calculated for two groups of receiving devices. The sixth column indicates how may receiving devices may be located/positioned when two groups of receiving devices are used. For example, for coarse RTT, 30 receiving devices can be located/positioned.

The seventh column indicates the rate at which the distance between broadcasting/receiving devices will be updated or calculated for ten groups of receiving devices. The sixth column indicates how may receiving devices may be located/positioned when ten groups of receiving devices are used. For example, for fractional with sounding sequence, 1590 receiving devices can be located/positioned.

In some embodiments, using advertising/response messages to determine RTT (rather than using a direct or one-to-one connection to determine RTT) may reduce the amount of time to determine the RTT for all receiving devices and may reduce power/energy consumption (by the different devices) by a factor of ~2.

In some embodiments, using advertising/response messages to determine RTT (rather than using a direct or one-to-one connection to determine RTT) may increases the rate at which the position/location of receiving devices are updated. In further embodiments, using advertising/response messages to determine RTT while using the multiple frequencies (as described in FIG. 6) increases reliability by using the entire 2.4 GHz spectrum for all the broadcasting devices.

Figure 10:
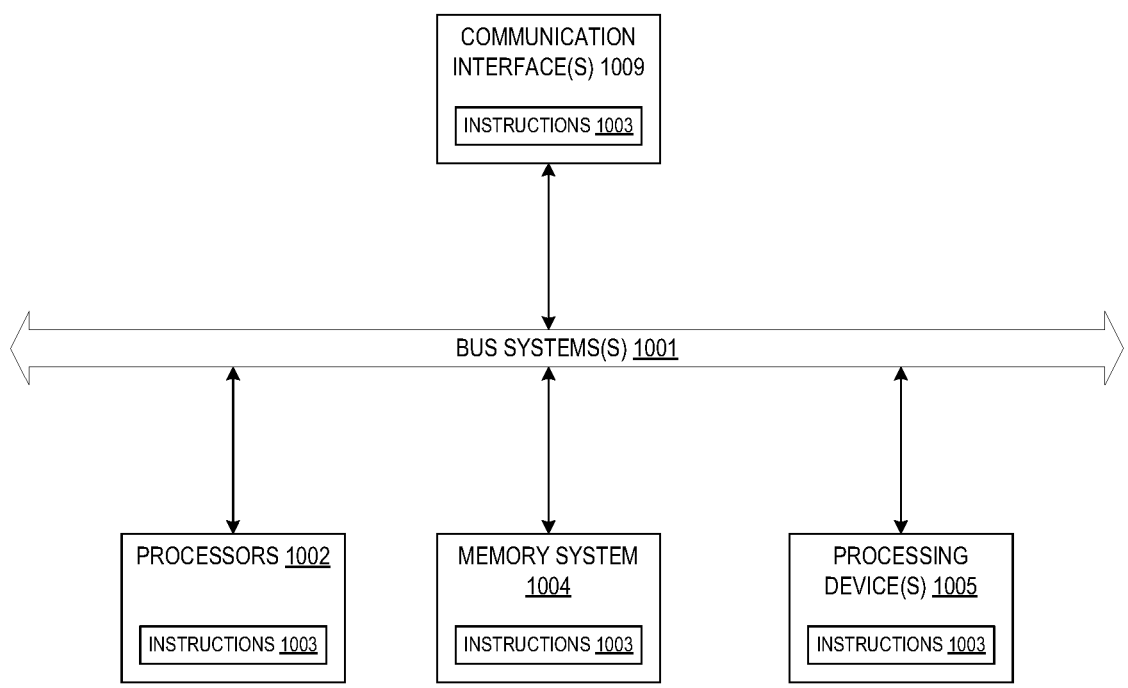
FIG. 10 is a block diagram illustrating a communication device according to one or more embodiments.

FIG. 10 is a block diagram illustrating a communication device 1000, in accordance with some embodiments of the present disclosure. The communication device 1000 may fully or partially include and/or operate the example embodiments of the apparatus 100 or portions thereof as described with respect to FIGS. 1-9. The communication device 1000 may be in the form of a computer system within which sets of instructions may be executed to cause the communication device 1000 to perform any one or more of the methodologies discussed herein. The communication device 1000 may operate as a standalone device or may be connected (e.g., networked) to other machines. In a networked deployment, the communication device 1000 may operate in the capacity of a server or a client machine in server-client network environment, or as a peer machine in a P2P (or distributed) network environment. The communication device 1000 may be an example of a broadcasting device, a receiving device, etc.

The communication device 1000 may be an Internet of Things (IoT) device, a server computer, a client computer, a personal computer (PC), a tablet, a set-top box (STB), a voice controlled hub (VCH), a Personal Digital Assistant (PDA), a mobile telephone, a web appliance, a network router, switch or bridge, a television, speakers, a remote control, a monitor, a handheld multi-media device, a handheld video player, a handheld gaming device, or a control panel, or any other machine capable of executing a set of instructions (sequential or otherwise) that specify actions to be taken by that machine. Further, while only a single communication device 1000 is illustrated, the term "device" shall also be taken to include any collection of machines that individually or jointly execute a set (or multiple sets) of instructions to perform any one or more of the methodologies discussed herein.

The communication device 1000 is shown to include processor(s) 1002. In embodiments, the communication device 1000 and/or processors(s) 1002 may include processing device(s) 1005 such as a System on a Chip processing device, developed by Cypress Semiconductor Corporation, San Jose, Calif. Alternatively, the communication device 1000 may include one or more other processing devices known by those of ordinary skill in the art, such as a microprocessor or central processing unit, an application processor, a host controller, a controller, special-purpose processor, digital signal processor (DSP), an application specific integrated circuit (ASIC), a field programmable gate array (FPGA), or the like. Bus system 1001 may include a communication block (not shown) to communicate with an internal or external component, such as an embedded controller or an application processor, via communication interfaces(s) 1009 and/or bus system 1001.

Components of the communication device 1000 may reside on a common carrier substrate such as, for example, an IC die substrate, a multi-chip module substrate, or the like. Alternatively, components of the communication device 1000 may be one or more separate ICs and/or discrete components. The memory system 1004 may include volatile memory and/or non-volatile memory which may communicate with one another via the bus system 1001. The memory system 1004 may include, for example, random access memory (RAM) and program flash. RAM may be static RAM (SRAM), and program flash may be a non-volatile storage/medium, which may be used to store firmware (e.g., control algorithms executable by processor(s) 1002 to implement operations described herein). The memory system 1004 may include instructions 1003 that when executed perform the methods described herein. Portions of the memory system 1004 may be dynamically allocated to provide caching, buffering, and/or other memory based functionalities.

The memory system 1004 may include a drive unit providing a machine-readable medium on which may be stored one or more sets of instructions 1003 (e.g., software) embodying any one or more of the methodologies or functions described herein. The instructions 1003 may also reside, completely or at least partially, within the other memory devices of the memory system 1004 and/or within the processor(s) 1002 during execution thereof by the communication device 1000, which in some embodiments, constitutes machine-readable media. The instructions 1003 may further be transmitted or received over a network via the communication interfaces(s) 1009.

In the above description, some portions of the detailed description are presented in terms of algorithms and symbolic representations of operations on analog signals and/or digital signals or data bits within a non-transitory storage medium. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "broadcasting," "associating," "transmitting," "determining," "switching," or the like, refer to the actions and processes of an integrated circuit (IC) controller, or similar electronic device, that manipulates and transforms data represented as physical (e.g., electronic) quantities within the controller's registers and memories into other data similarly represented as physical quantities within controller memories or registers or other such information non-transitory storage medium.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus (e.g., such as an AC-DC converter) for performing the operations herein. This apparatus may be specially constructed for the required purposes, or it may comprise firmware or hardware logic selectively activated or reconfigured by the apparatus. Such firmware may be stored in a non-transitory computer-readable storage medium, such as, but not limited to, read-only memories (ROMs), random access memories (RAMs), EPROMS, EEPROMs, flash memory, or any type of media suitable for storing electronic instructions. The term "computer-readable storage medium" should be taken to include a single medium or multiple media that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method of a broadcasting device, comprising:
    broadcasting a broadcast message to a plurality of receiving devices via connectionless communications using a Bluetooth protocol during a first timeslot of a sub-interval of an advertisement interval according to the Bluetooth protocol, wherein each subsequent timeslot in the sub-interval is associated with one of the plurality of receiving devices;
    receiving, via the connectionless communications using the Bluetooth protocol, from each of the plurality of receiving devices during a respective subsequent timeslot of the sub-interval of the advertisement interval, a response message comprising first data, wherein each response message further comprises second data indicating at least one of an angle of arrival and an angle of departure; and
    determining, based on using the Bluetooth protocol to both broadcast the broadcast message and receive the response message, a distance between the broadcasting device and each of the plurality of receiving devices using the first data in each response message.

2. The method of claim 1, wherein the broadcast message comprises one or more of an AUX_SYNC_IND packet and a NEW_ADVERTISEMENT packet.

3. The method of claim 1, wherein the first data in each response message comprises one or more of:
    a first time when the broadcast message was received by the respective receiving device of the plurality of receiving devices;
    a second time when the response message was transmitted by the respective receiving device of the plurality of receiving devices; and
    a difference between the first time and the second time.

4. The method of claim 1, wherein the broadcasting of the broadcast message and the receiving of each response message are via an advertising communication channel between the broadcasting device and each of the plurality of receiving devices.

5. The method of claim 1, wherein:
    each response message further comprises an access address associated with the respective receiving device of the plurality of receiving devices.

6. The method of claim 1, wherein:
    the response message further comprises additional timing data, wherein the additional timing data is used to determine a time when the response message was received.

7. The method of claim 1, wherein the second data is included in at least one of a protocol data unit of the response message and a constant tone extension of the response message.

8. The method of claim 1, wherein:
    the broadcasting device is one of a plurality of broadcasting devices that transmit additional broadcast messages and receive additional response messages from the plurality of receiving devices.

9. The method of claim 8 wherein:
    each of the broadcast message and the additional broadcast messages is broadcasted during a sub-interval of an advertisement interval; and
    each of the response messages and the additional response messages are received during the sub-interval of the advertisement interval.

10. The method of claim 8, wherein:
each of the broadcast message and the additional broadcast messages is broadcasted using different frequencies; and
each of the response messages and the additional response messages are received using the different frequencies.

11. A method, comprising:
receiving, at a receiving device using a Bluetooth protocol during a first timeslot of a sub-interval of an advertisement interval according to the Bluetooth protocol, a broadcast message broadcasted by a broadcasting device; and
transmitting, via connectionless communications using the Bluetooth protocol, a response message to the broadcasting device, wherein:
the response message is transmitted during a second timeslot of the sub-interval of the advertisement interval corresponding to the Bluetooth protocol;
the response message comprises first data used by the broadcasting device to determine a distance between the broadcasting device and the receiving device; and
the response message comprises second data indicating at least one of an angle of arrival and an angle of departure.

12. The method of claim 11, wherein the broadcast message comprises one or more of a Bluetooth AUX_SYNC_IND packet and a Bluetooth NEW_ADVERTISEMENT packet.

13. The method of claim 11, wherein:
the first data comprises an access address for the receiving device.

14. The method of claim 11, further comprising:
receiving additional broadcast messages from additional broadcasting devices; and
transmitting additional response messages to the additional broadcasting devices, wherein a position for the receiving device is determined based on the response message and the additional response messages.

15. A system, comprising:
a broadcasting device, the broadcasting device configured to broadcast, via connectionless communications using a Bluetooth protocol, a broadcast message to a plurality of receiving devices during a first timeslot of a sub-interval of an advertisement interval corresponding to the Bluetooth protocol, wherein each subsequent timeslot in the sub-interval is associated with one of the plurality of receiving devices; and
a receiving device, wherein the receiving device is one of the plurality of receiving devices, the receiving device configured to receive, the broadcast message and responsively transmit, via the connectionless communication during a second timeslot of the sub-interval of the advertisement interval corresponding to the Bluetooth protocol, a response message, that includes first data, to the broadcasting device, wherein using the Bluetooth protocol, the broadcasting device is configured to use the first data to determine a distance between the broadcasting device and the receiving device, wherein the response message further comprises second data indicating at least one of an angle of arrival and an angle of departure.

* * * * *